US011436462B2

(12) United States Patent
Chiu et al.

(10) Patent No.: US 11,436,462 B2
(45) Date of Patent: Sep. 6, 2022

(54) ACCESSORY FOR A TAG DEVICE AND A TAG DEVICE USING THE SAME

(71) Applicant: Logistics and Supply Chain MultiTech R&D Centre Limited, Pok Fu Lam (HK)

(72) Inventors: Leung Chiu, Pok Fu Lam (HK); Jing Jung Tang, Pok Fu Lam (HK)

(73) Assignee: Logistics and Supply Chain Multitech R&D Centre Limited, Pok Fu Lam (HK)

( * ) Notice: Subject to any disclaimer, the term of this patent is extended or adjusted under 35 U.S.C. 154(b) by 0 days.

(21) Appl. No.: 17/139,101

(22) Filed: Dec. 31, 2020

(65) Prior Publication Data
US 2022/0207318 A1    Jun. 30, 2022

(51) Int. Cl.
G06K 19/077    (2006.01)
G06K 19/00     (2006.01)

(52) U.S. Cl.
CPC ..... G06K 19/07728 (2013.01); G06K 19/005 (2013.01); G06K 19/07773 (2013.01)

(58) Field of Classification Search
CPC .......... G06K 19/005; G06K 19/07728; G06K 19/07758; G06K 19/07773; G06K 19/07794; B60R 2011/0026; B60R 2011/0063; B60R 2011/0075; B60R 2011/0077; G09F 9/203

USPC ......... 235/486, 492; 340/572.1, 572.7, 572.8
See application file for complete search history.

(56) References Cited

U.S. PATENT DOCUMENTS

| | | | | |
|---|---|---|---|---|
| 8,149,123 | B2* | 4/2012 | Ichiboshi | G08C 17/04 340/572.8 |
| 2006/0243811 | A1* | 11/2006 | Koyama | G06K 19/005 235/492 |
| 2007/0205282 | A1* | 9/2007 | Nakabo | G06K 13/0893 235/451 |
| 2010/0285746 | A1* | 11/2010 | Tsirline | H04B 5/0062 455/41.1 |

FOREIGN PATENT DOCUMENTS

JP          09319906 A  * 12/1997

* cited by examiner

*Primary Examiner* — Suezu Ellis
(74) *Attorney, Agent, or Firm* — Renner, Kenner, Greive, Bobak, Taylor & Weber

(57) ABSTRACT

An accessory for a tag device and a RFID tagging device using the accessory. The accessory includes a tag holder defining with a slot arranged to receive the tag device and to removably secure the tag device in a predetermined position; and an antenna provided on the tag holder, wherein the antenna has a radiator arranged to couple to a feeder of the tag device when the tag device is positioned in the predetermined position within the slot.

20 Claims, 14 Drawing Sheets

ACCESSORY FOR A TAG DEVICE AND A TAG DEVICE USING THE SAME

TECHNICAL FIELD

The present invention relates to an accessory for a tagging device and a tagging device using the accessory, although not exclusively, to an accessory having a tag holder arranged to receive and removably secure the tagging device.

BACKGROUND

Information may be stored in electronic devices and may be accessed by a suitable reader. For example, tagging information stored in RFID tags may be read by an RFID reader. The communication link between the tags and the reader relies on a wireless coupling, in which the tags and the reader may communicate with electromagnetic radiation or radio frequency signals.

RFID tags may be readable when it is placed within a reading range of the RFID reader. This may depend on several parameters in different systems, such as transmission power of RF signals, operation frequency, antenna designs, coupling efficiencies, obstacles between the tags and the readers, active or passive RFID technologies, etc. Tag antennas on RFID tags may also play an important role in the communication link between the RFID tags and the RFID readers.

SUMMARY OF THE INVENTION

In accordance with a first aspect of the present invention, there is provided an accessory for a tag device, comprising a tag holder defining with a slot arranged to receive the tag device and to removably secure the tag device in a predetermined position; and an antenna provided on the tag holder, wherein the antenna has a radiator arranged to couple to a feeder of the tag device when the tag device is positioned in the predetermined position within the slot.

In an embodiment of the first aspect, the radiator is arranged to couple to the feeder when the radiator and the feeder are aligned.

In an embodiment of the first aspect, the slot comprises an alignment mechanism arranged to align the tag device in the predetermined position within the slot.

In an embodiment of the first aspect, the alignment mechanism includes a magnet arranged to cooperate with a counter-piece provided at a corresponding position on the tag device.

In an embodiment of the first aspect, the counter-piece comprises a counter-magnet arranged to magnetically couple with the tag device when placed in the predetermined position within the slot.

In an embodiment of the first aspect, the tag device is in form of a card.

In an embodiment of the first aspect, the counter-piece is provided on a front surface of the card.

In an embodiment of the first aspect, the counter-piece is further arranged to resist the tag device from being secured by the tag holder when the tag device is in the slot with a back surface of the card placed proximally to the magnet.

In an embodiment of the first aspect, the tag device is repelled by a mutual repulsive force generated by magnets with the same polarity on both the tag device and the slot.

In an embodiment of the first aspect, the alignment mechanism further comprises a mechanical guiding structure arranged to match with the tag device.

In an embodiment of the first aspect, the mechanical guiding structure includes at least one groove arranged to match with a respective edge of the tag device.

In an embodiment of the first aspect, the radiator is a dipole antenna.

In an embodiment of the first aspect, the feeder is a small-loop antenna.

In an embodiment of the first aspect, the tag holder and/or the tag device comprise a dielectric material.

In an embodiment of the first aspect, a multi-layer tag antenna is formed by a combination of the radiator and the feeder when the two are aligned.

In an embodiment of the first aspect, the tag device comprises an electronic device arranged to tag an object.

In an embodiment of the first aspect, the tag holder is fixedly attached to an object.

In an embodiment of the first aspect, the object is a vehicle.

In an embodiment of the first aspect, the tag holder is fixedly attached to a windshield of the vehicle.

In an embodiment of the first aspect, the electronic device is arranged to operate with an electromagnetic radiation received by the radiator.

In an embodiment of the first aspect, the electromagnetic radiation is a radio frequency signal.

In an embodiment of the first aspect, the tag device is a radio frequency identification (RFID) card.

In accordance with the second aspect of the present invention, there is provided a radio frequency identification (RFID) tagging device comprising a tag device in a form of an RFID card, and an accessory in accordance with the first aspect of the present invention, wherein the tag holder is arranged to receive the RFID card and to removably secure the RFID card in the predetermined position within the slot defined by the tag holder.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Standalone RFID tags may have an enhanced reading performance when they are in certain proximity to a tag holder equipped with an antenna. However, the inventors have, through their own researches, trials, and experiments, devised that there may be stringent requirements for aligning the tag and the tag holder in order to achieve such enhanced performance. For example, the inventors have devised that the antenna of the tag holder and the antenna of the tag may have to be separated within a threshold distance of 0.1 mm, and both the antennas may have to be placed in a particular orientation and/or direction as well in order to achieve the enhanced performance. It is appreciated that such a tiny distance would be extremely easy to be triggered by manual operation such as when a user places the tag into a slot of the tag holder without any alignment mechanism and/or guiding structure to aid the user.

Accordingly, the present invention seeks to eliminate or at least to mitigate such shortcomings by providing a new or otherwise improved accessory for a tag device.

Figure 1A:
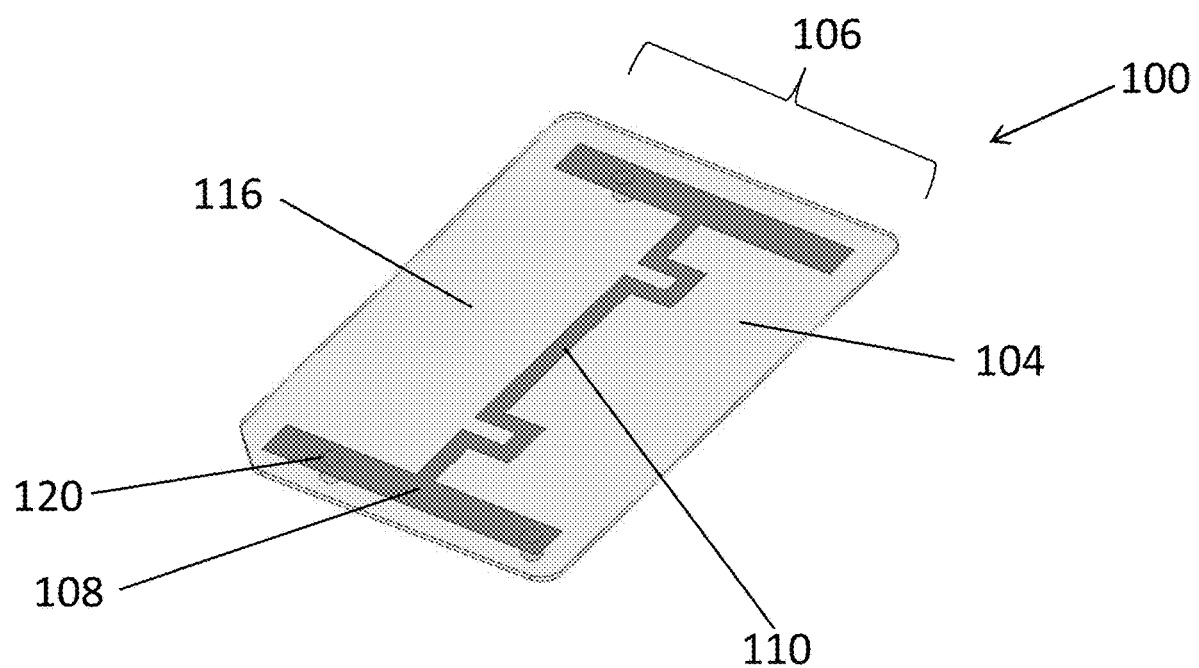
FIG. 1A is a schematic diagram showing an accessory in accordance with one embodiment of the present invention.
Figure 1B:
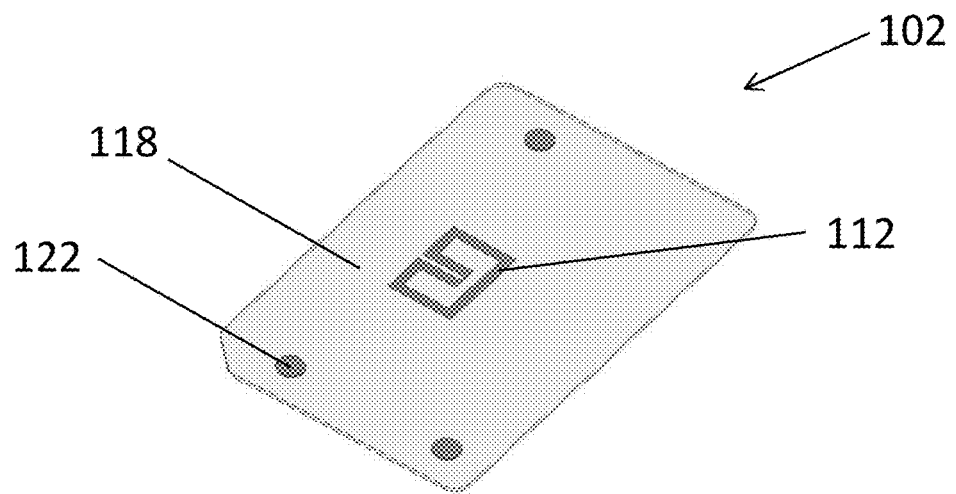
FIG. 1B is a schematic diagram showing a tag device in accordance with one embodiment of the present invention.

With reference to FIGS. 1A to 1B, there is provided an embodiment of an accessory 100 for a tag device 102, comprising a tag holder 104 defining with a slot 106 arranged to receive the tag device 102 and to removably secure the tag device 102 in a predetermined position; and an antenna 108 provided on the tag holder 104, wherein the antenna 108 has a radiator 110 arranged to couple to a feeder 112 of the tag device 102 when the tag device 102 is positioned in the predetermined position within the slot 106.

In this embodiment, the tag holder 104 may be a component of the tag device 102, such as an RFID tag for tagging an object. The tag device 102 may include an electronic device 114 which is another essential component of the tag device 102. The electronic device 114 may be an RFID chip or integrated circuit (IC) and may store tagging information for tagging the object. For example, the tagging information may consist of an alphanumeric string representing an identifier of an object, and the tagging information may be accessed by a suitable reader such as an RFID reader. The RFID reader may transmit an electromagnetic radiation or a radio frequency (RF) signal to the electronic device 114 or the RFID chip 114 such that the reader and the electronic device 114 may communicate.

The antenna 108 of the tag holder 104 may be selectively coupled to the electronic device 114 or the RFID chip 114 when the tag device 102 is positioned within the slot 106, such that the tag device 102 (such as a passive RFID tag) may operate with the received electromagnetic radiation when the chip 114 is coupled to the antenna 108. In other words, the passive RFID tag is not readable by an RFID reader when the antenna 108 is not coupled to the RFID chip 114 since a communication link between the electronic device 114 and the reader may not be established.

Figure 2A:
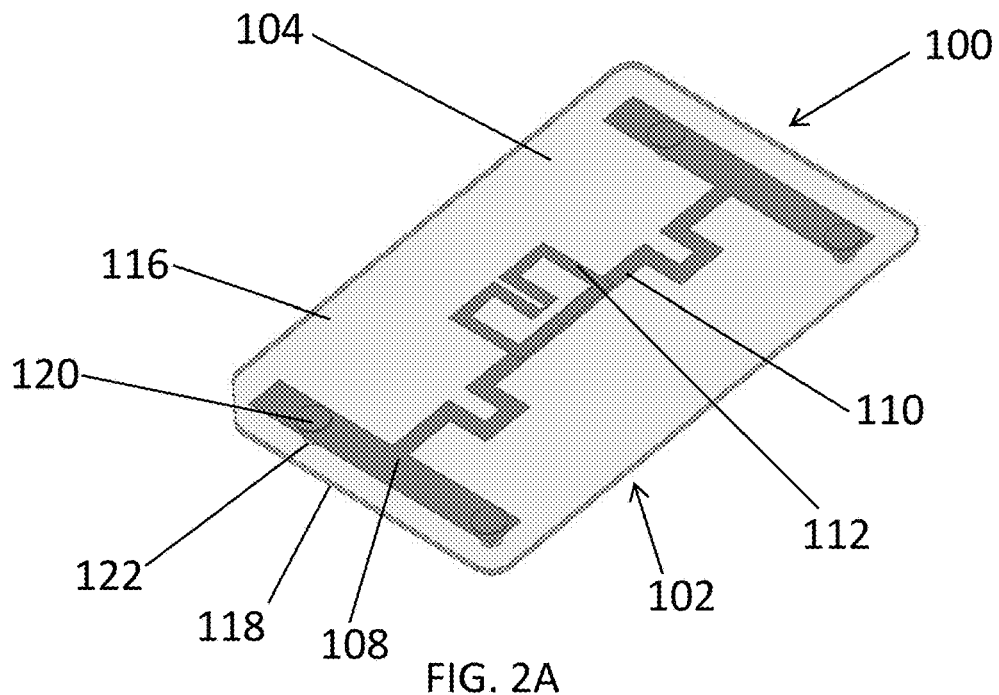
FIG. 2A is a schematic diagram showing an accessory receiving and removably securing a tag device in accordance with one embodiment of the present invention.
Figure 2B:
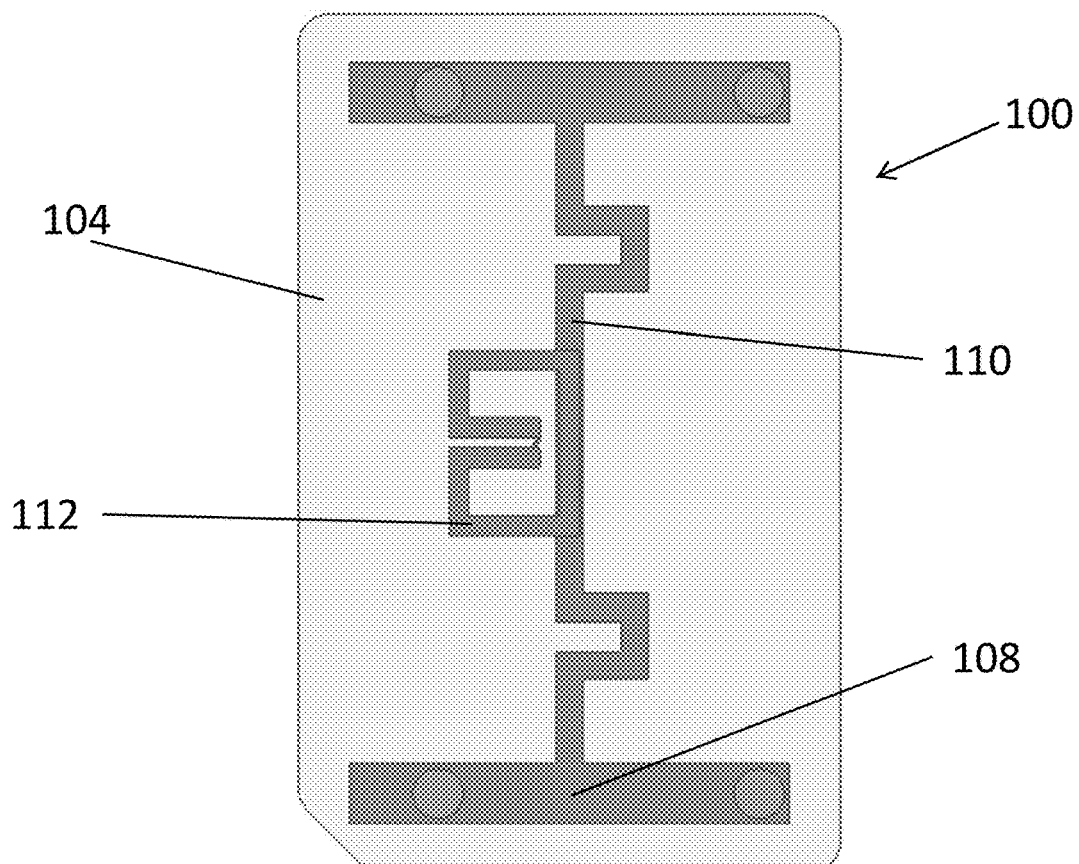
FIG. 2B is a schematic diagram showing an enlarged portion of an aligned feeder and the radiator of the aligned accessory and tag device of FIG. 2A.
Figure 3A:
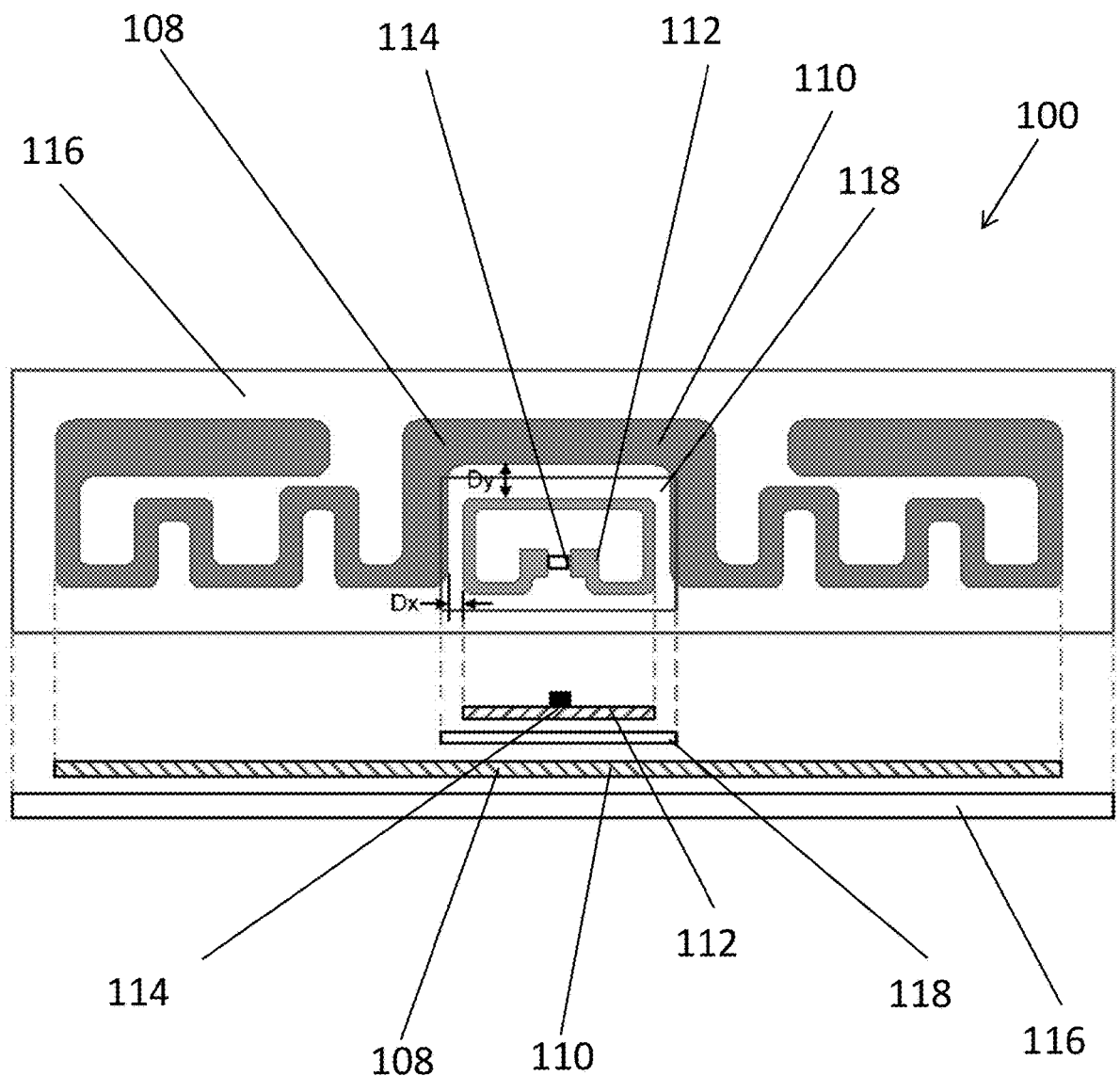
FIG. 3A is an illustration showing a top view and a side view when an accessory receives and removably secures a tag device in accordance with one embodiment of the present invention.

With reference to FIGS. 2A, 2B, and 3A, there is shown an embodiment of a tag holder 104 with a tag device 102 removably received within the slot 106 of the tag holder 104. It is appreciated that since the tag holder 104 is removably receiving the tag device 102, the antenna 108 is appreciated to be separable from the electronic device 114 or the RFID chip 114, and these two components may be separately fabricated. Preferably, the antenna 108 and the RFID chip 114 may be fabricated on different substrates. For example, the antenna 108 may be fabricated on a first substrate 116 and the RFID chip 114 may be fabricated on a second substrate 118 separated from the first substrate 116 and the antenna 108. On the second substrate 118, an intermediate antenna component such as a feeder 112 may also be fabricated thereon, and the feeder 112 may be connected to the electronic device 114.

In one example embodiment, the antenna 108 may have a radiator 110 fabricated on the first substrate 116, and the intermediate antenna component is a feeder 112 fabricated on the second substrate 118. The feeder 112 may be considered as a near read-range radiator. The radiator 110 may selectively couple to the feeder 112 such that the RFID chip 114 may receive and operate with an electromagnetic radiation received by the radiator 110 via the feeder 112 (electromagnetically) coupled to the radiator 110 when the radiator 110 and the feeder 112 are substantially aligned with each other. Preferably, the first and/or the second substrates 116, 118 comprise a dielectric material such as a paper, polymer, glass or any material with a suitable dielectric constant according to different performance requirements.

The coupling between the radiator 110 and the feeder 112 is established by placing the feeder 112 proximate to the radiator 110, and the coupling strength is enhanced when the radiator 110 and the feeder 112 is substantially aligned as shown in FIGS. 2A, 2B and 3A. In particular, the coupling may be established when the tag device 102 is positioned within the slot 106 of the tag holder 104 with an aid of an alignment mechanism. In one example, the alignment mechanism may include at least one magnet 120 arranged to cooperate with at least one counter-piece 122 provided at corresponding positions on the tag device 102. Preferably, the at least one counter-piece 122 may include counter-magnets 122 arranged to magnetically couple with the at least one magnet 120 when the tag device 102 is placed within the slot 106.

Alternatively, one or more of these counter-pieces 122 may be ferromagnetic elements such as an iron piece which may be attracted by the magnets 120 when the tag device is placed within the slot.

Referring to FIGS. 1A, 1B, and 2A, the tag holder 104 may include three magnets 120 arranged at three corners of the slot 106, and the position of the magnets 120 are corresponding to the three counter-magnets 122 provided on the tag device 102. When tag device 102 is brought proximate to the slot area 106, the tag device 102 will be aligned within the slot 106 via the magnetic coupling of the three pairs of magnet 120, 122. In a preferred embodiment, the counter-magnets 122 may be provided on the front surface of the tag device 102. In this way, the tag device 102 may be repelled by a mutual repulsive force generated between the magnets 120 and the counter-magnets 122 of the same polarity. Advantageously, such a resistance of the tag device 102 from being secured by the tag holder 104 may provide a (tactile) signal to the user that the back surface of the tag device 102 is now facing toward the tag holder 104, avoiding the user from misaligning the tag device 102 with the tag holder 104 and therefore misaligning the feeder 112 and the radiator 110, which may eventually lead to a failure of reading the tag.

Alternatively, one or more of these counter-magnets or the iron/metal pieces may be embedded inside the card-shaped body of the tag device 102.

In an alternative embodiment, the alignment mechanism of tag holder 104 may further comprise a mechanical guiding structure such as at least one groove that is arranged to match with a respective edge of the tag device 102. With the use of the at least one groove, the tag holder 104 may provide additional means to hold the tag device 102, such that the tag device 102 may be received within the groove and minimized from detachment when the magnetic coupling between the magnets 120 and the counter-magnets 122 fails in occasion such as vibration received upon driving.

With the alignment mechanism as mentioned above, in one example, the feeder 112 and the radiator 110 may be aligned with distances $D_x$ and $D_y$ therebetween as shown in FIG. 3A, such that the tag device 102 may be configured to operate as a long read-range tag. By aligning the relative position between the tag device and the tag holder, such distances $D_x$ and $D_y$ are maintained to be relatively constant every time when the tag device and the tag holder are secured together.

Figure 3B:
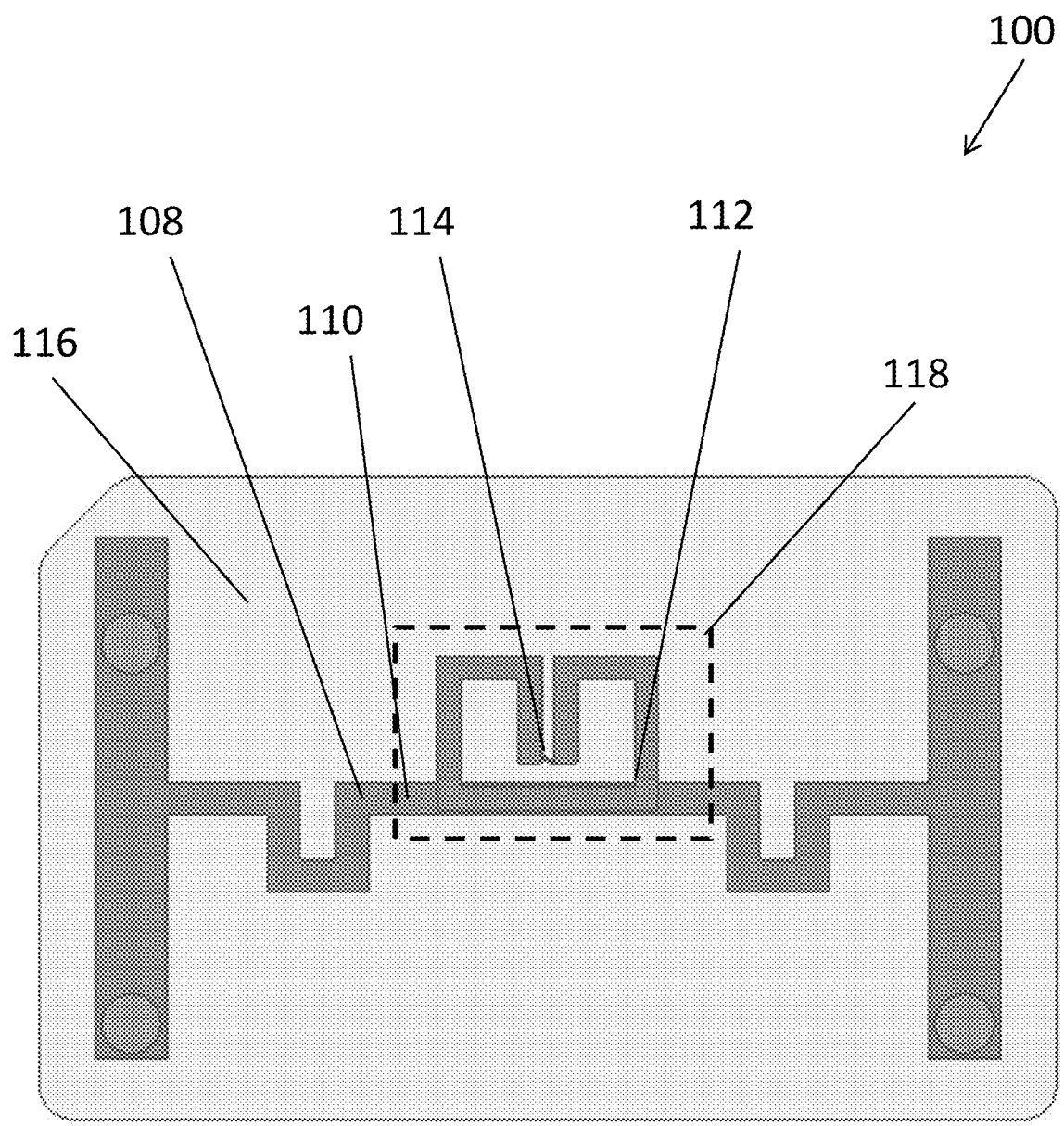
FIG. 3B is an illustration showing a top view of an aligned feeder and the radiator of the aligned accessory and tag device in accordance with another embodiment of the present invention.
Figure 3C:
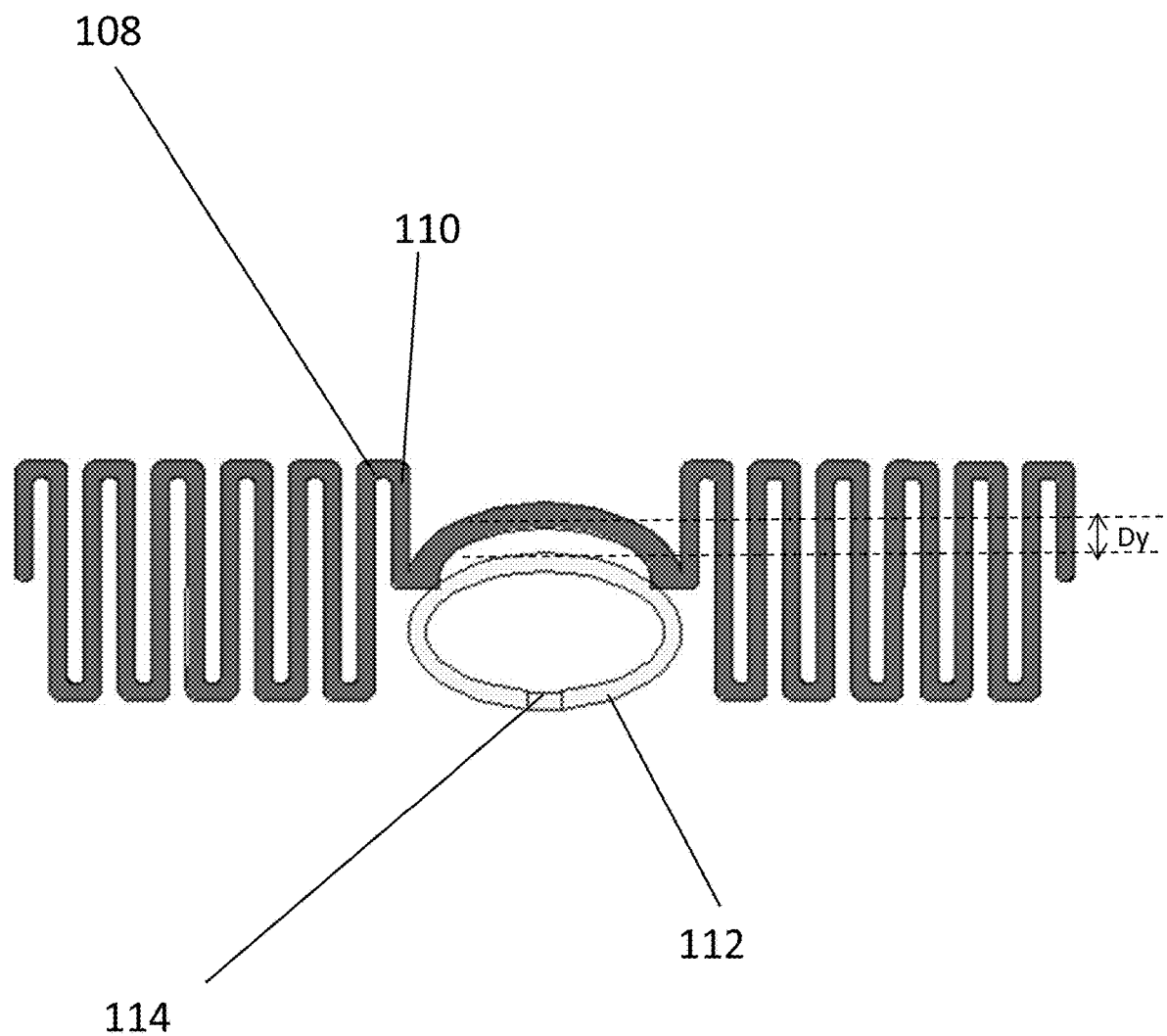
FIG. 3C is an illustration showing a top view of an aligned feeder and the radiator of the aligned accessory and tag device in accordance with another embodiment of the present invention.

In an alternative embodiment, referring to FIG. 3B, the shapes and dimensions of the tag chip 114, the feeder 112 and the radiator 110 may be differently defined. In this example, the feeder 112 is connected to the tag chip 114 to form a substantially oval-shaped closed loop, and the radiator 110 includes a coupling section in a substantially centre portion of the radiator which matches with the shape of the feeder 112. Optionally, the alignment distances may be of $D_x$ and/or $D_y$ which are similar to those defined in the previous embodiment.

Preferably, the radiator 110 is arranged to be not (fully) functional when the radiator 110 is uncoupled to the feeder 112. In other words, the radiator 110 is only functional when it is properly coupled and substantially aligned with the feeder 112 so as to become functional and hence the radiator 110 may then be operable to receive an electromagnetic signal from a reader such as an RFID reader. Without wishing to be bound by theory, the radiator 110 may be included to extend the operation range of the tag device embedded with the feeder and the tag chip, such that the tag may be read by RFID readers with different operational specifications including reading ranges.

In such configuration, the combination of the radiator 110 and the feeder 112 may form a multi-layer tag antenna, which allows the electronic device 114 connected to the multi-layer tag antenna to wirelessly communicate with a reader via an electromagnetic radiation such as an RF signal.

In this example embodiment, the multi-layer tag antenna comprises a dipole antenna as the radiator 110 on the first substrate 116 and a small-loop antenna as the feeder 112 which is electrically connected to the RFID chip 114 on the second substrate 118. Preferably, the radiator 110 and the feeder 112 are made of an electrical conductive material such as copper or any other metal which is suitable for antenna applications.

To prevent the access of tagging information stored in the electronic device 114 (such as by an RFID reader), the radiator 110 may be physically separated from the feeder 112 and the electronic device 114, as separately shown in the standalone structures in FIGS. 1A and 1B. This effectively removes the coupling of the electronic device 114 from the antenna 108 and thus the essential communication link is terminated, and the electronic device 114 may not operate with an electromagnetic radiation or an RF signal without the antenna 108 or the radiator 110.

Figure 4A:
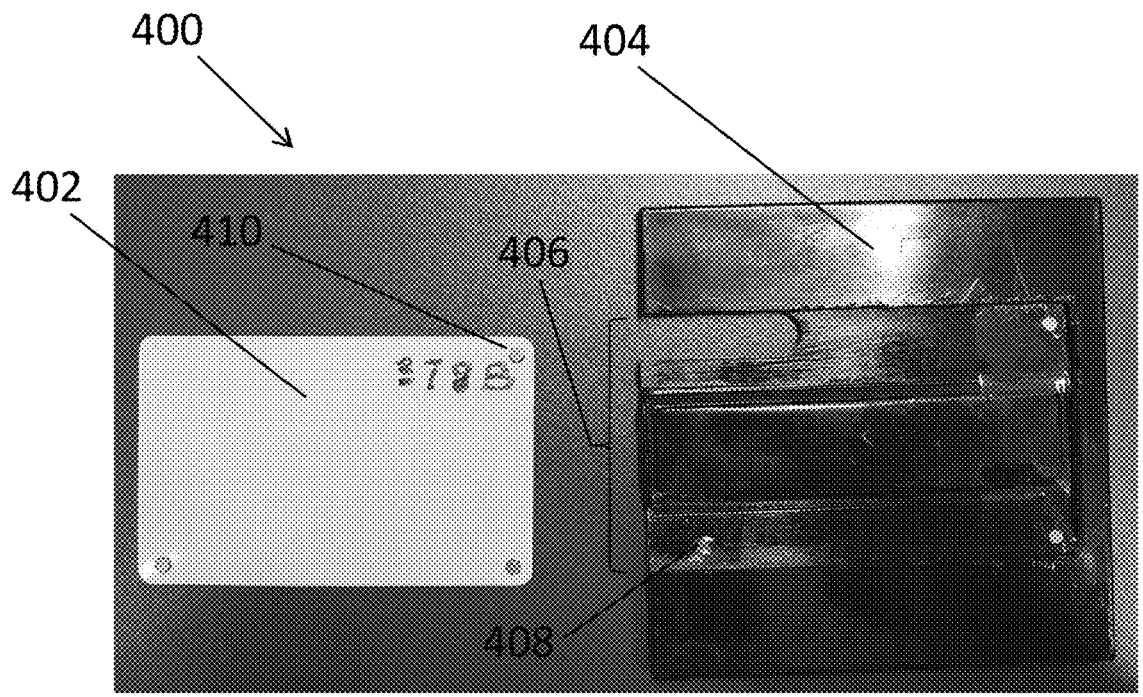
FIG. 4A is a perspective view of a RFID tagging device with an RFID card being removed from the tag holder.
Figure 4B:
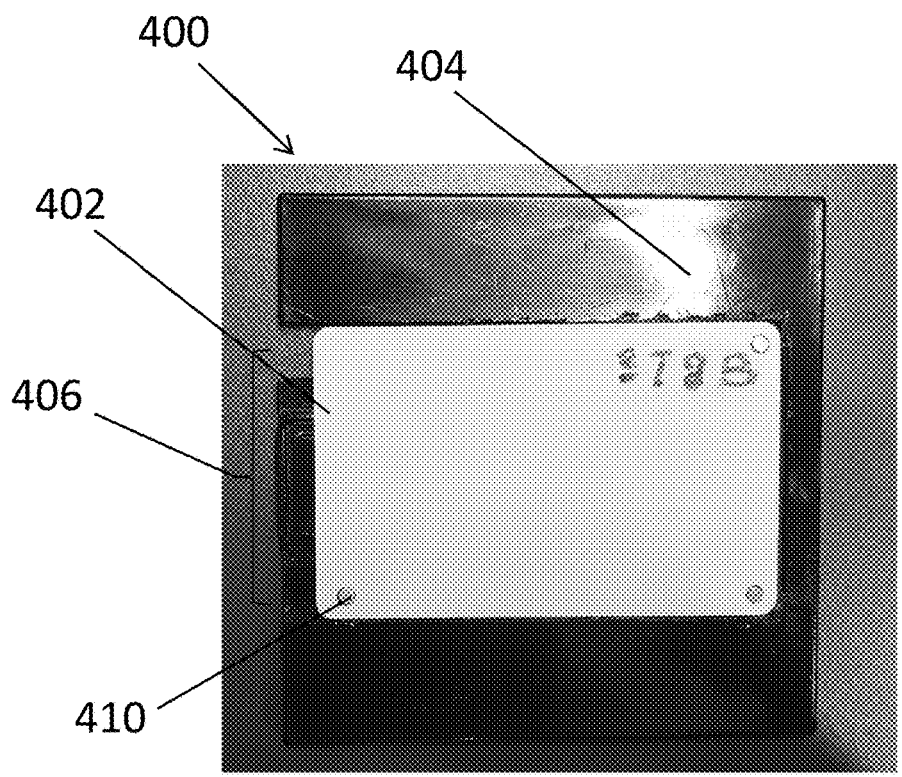
FIG. 4B is a perspective view of the RFID tagging device of FIG. 4A with the RFID card being removably secured within the tag holder via magnetic coupling.
Figure 5:
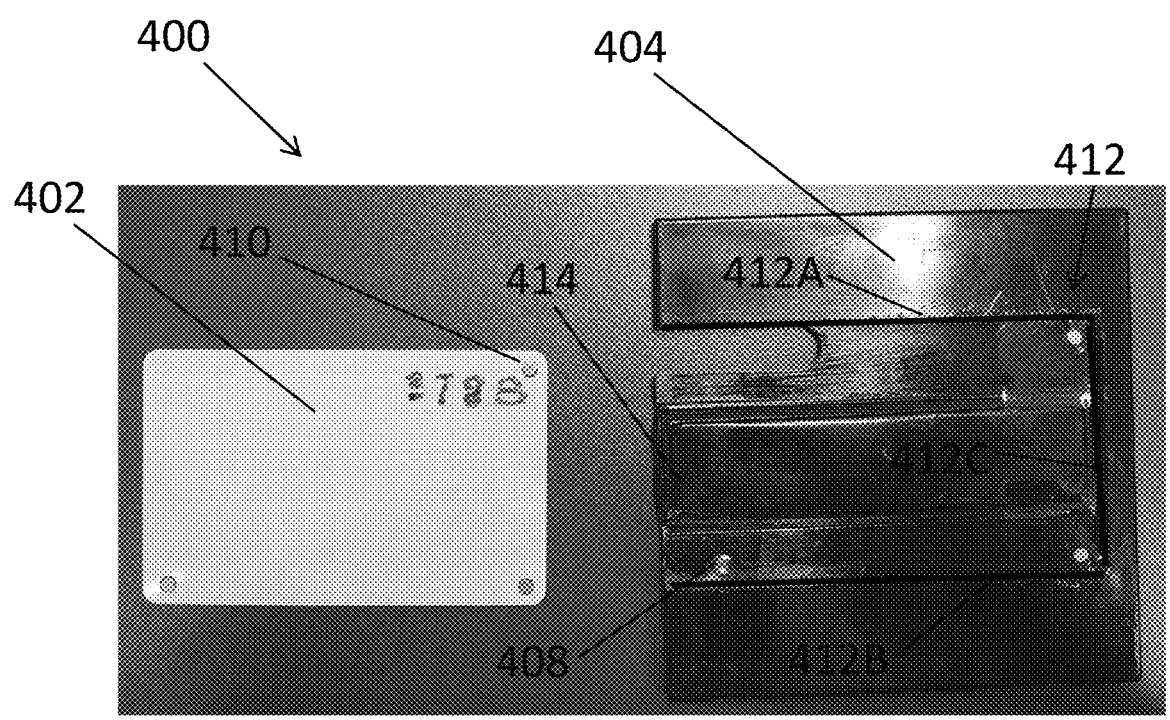
FIG. 5 is a perspective view of the RFID tagging device of FIG. 4A showing a covered radiator and a plurality of mechanical guidelines for receiving the RFID card.

With reference to FIGS. 4 to 5, there is shown an example embodiment of an RFID tagging device 400 comprising a tag device 402 in form of an RFID card and an accessory 100 as mentioned above, wherein the tag holder 404 is arranged to receive the RFID card 402 and to removably secure the RFID card 402 in the predetermined position within the slot 406 defined the tag holder 404.

In this embodiment, the feeder 112 and the electronic device 114 (such as an RFID chip) are fabricated on a second substrate 118. The combination of the feeder 112 and the electronic device 114 may be further concealed or packaged as an RFID card 402 which may be easily carried by a user. The antenna 108 comprising the radiator 110 is fabricated at a central region of a first substrate 116, namely, the central region of a surface within the slot 406 of the tag holder 404. The slot 406 of the tag holder 404 includes three magnets 408 located at three corners of the slot 406 as shown in FIG. 4A. These magnets correspond to the counter-magnets 410 provided on the front surface of the RFID card 402. In other words, when the RFID card 402 is placed within the slot 406 of the tag holder 404, with the front surface facing upward, the polarities of the magnets 408 on the tag holder 404 and the counter-magnets 410 on the front surface of the RFID card 402 will be opposite and therefore magnetically coupled with each other. As such, the RFID card 402 is accurately aligned and removably secured within the slot 406 of the tag holder 404 as shown in FIG. 4B, and in this way, the feeder 112 and the radiator 110 are substantially aligned, such that the communication link depending on the aligned radiator 110 and the feeder 112 may be guaranteed when the RFID card 402 and the tag holder 404 are combined or placed proximate to each other.

In contrast, as the counter-magnets 410 provided on the front surface of the RFID card 402 is of opposite polarity to the magnets 408 provided on the tag holder 404, any disorientation or misdirection of putting the RFID card 402, such as by facing the back surface upwards, into the slot 406 would lead to a resistance or even a mutual repulsion between the counter-magnets 410 of the RFID card 402 and the magnets 408 of the tag holder 404, as a result of same magnet polarity. As mentioned, it is advantageous as the user may easily recognize the card 402 is being put in an incorrect orientation and/or direction based on resistance/ repulsive force provided by the pairs of magnet 408 and counter-magnets 410.

Referring to FIG. 5, the tag holder 404 may further includes a series of mechanical guidelines 412 that match the edges of the RFID card 402. In this example, the mechanical guidelines 412 are in form of a pair of grooves provided on the opposite sides of the slot arranged to keep the RFID card 402 in the predetermined position when the RFID card 402 is placed within the slot of the tag holder.

Optionally or additionally, the groove and/or the edge of the RFID card 402 may be further provided with matching detent structures so as to further ensure that the RFID card 402 is secured in the aligned position. In addition, the detent structures may also prevent the RFID card 402 from being placed into the slot in a wrong orientation. Alternatively, these detent structures may be provided on any matching surfaces and/or edges of both the holder and the RFID card 402.

Advantageously, the matching detent structures may further provide an indication to the user whether the RFID card has been put into the tag holder in the aligned position.

In this example, the RFID card 402 may be inserted into the slot 406 of the tag holder 404 by sliding inwards along the upper and the lower guidelines 412A and 412B till reaching vertical guideline 412C at the end of the slot 406. Upon the card 402 slides into the slot 406, the card 402 will be secured by the magnetic coupling between the magnets 408 and the counter-magnets 410 simultaneously. In other words, the mechanical guidelines cooperate with the magnetic mechanism so as to provide an additional means for securing the RFID card during operation.

Alternatively, the tag holder may be provided with no grooves or guidelines as described above, for example when the magnetic coupling between the tag holder and the tag device is sufficient to keep the two parts in place and well aligned when in use. In this example, the tag holder may be provided as a flat substrate embedding the radiator and the magnetic couplers, such that the user may simply attach the RFID card 402 to the tag holder which may be secured to a windshield of a vehicle when he drives and grabs the RFID 402 when he leaves the vehicle.

Yet alternatively, the tag holder may be fixed at the top of the dashboard such that the RFID card may be secured at such a position readable by an RFID reader ahead of the vehicle.

The tag holder 404 may further include a housing 414 substantially covering or concealing the radiator 110 of the tag holder 404 therewithin. As such, the radiator 110 may be protected from being damage or scratched when the RFID card 402 slides into the slot 406 or removed from the slot 406. The housing 414 may also protect the radiator 110 from being degraded by different corrosion sources.

Figure 6A:
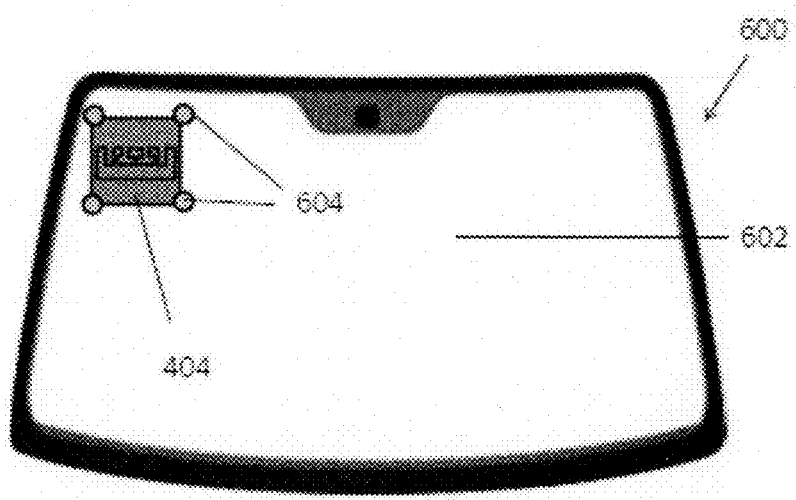
FIG. 6A is an illustration showing an accessory in accordance with one embodiment of the present invention, wherein the accessory is attached to an object.
Figure 6B:
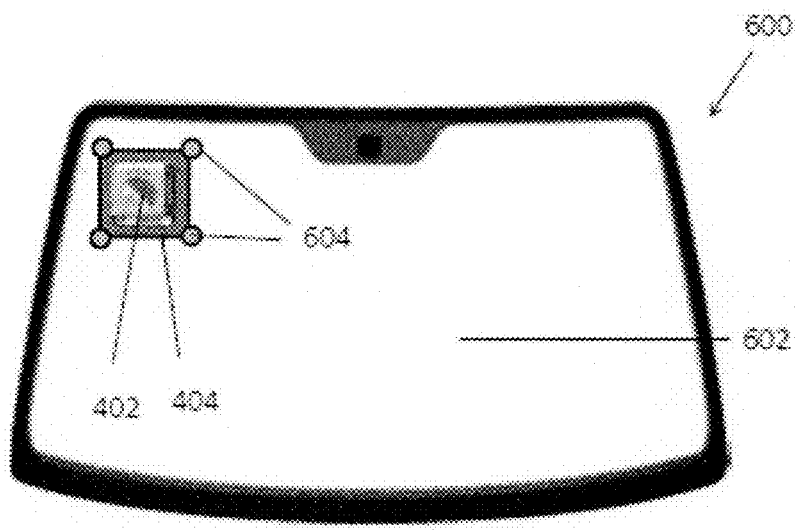
FIG. 6B is an illustration showing a tag device coupled to the accessory of FIG. 6A.
Figure 7:
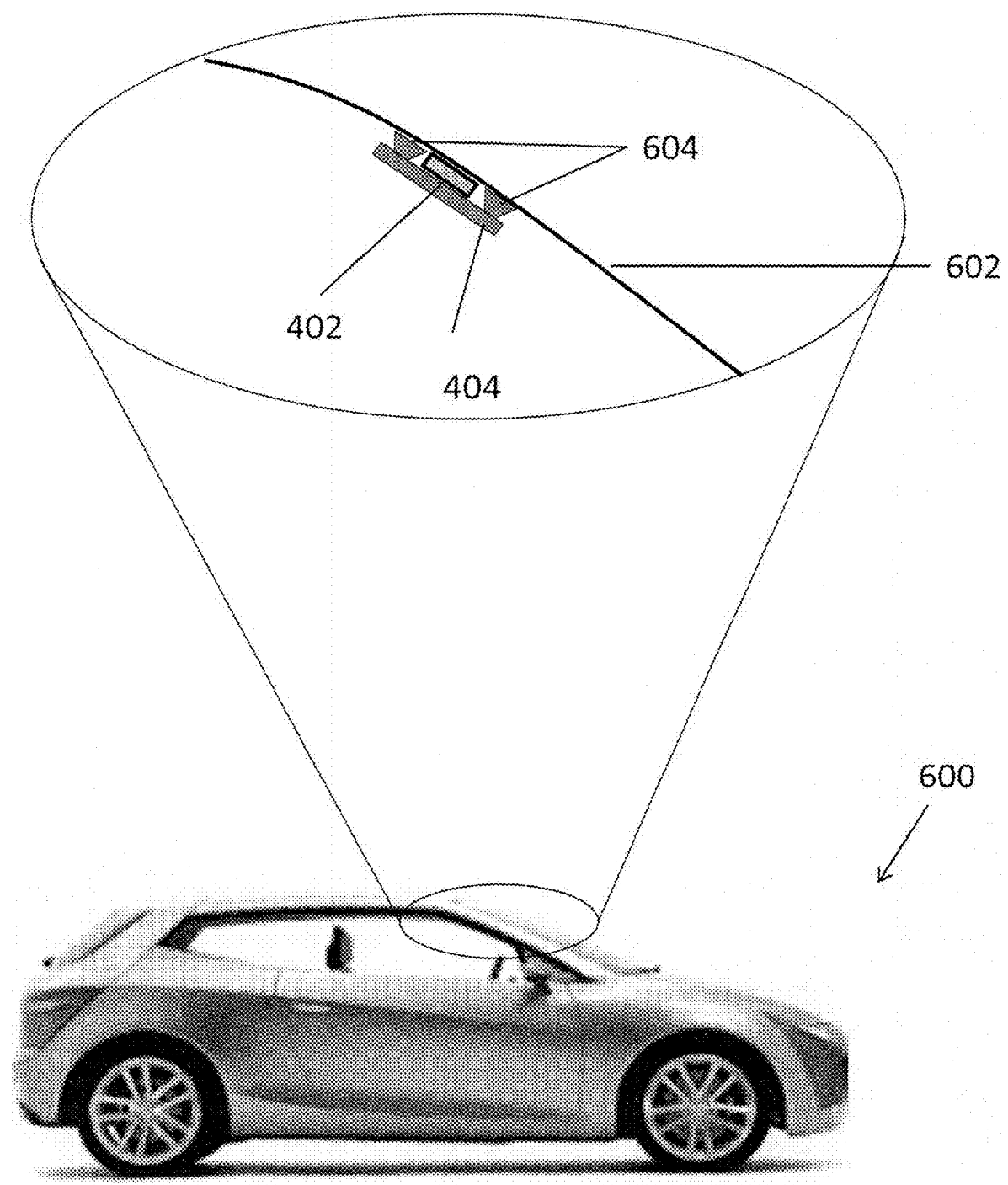
FIG. 7 is an illustration showing a tag device coupled to the accessory of FIG. 6A, wherein the object is a vehicle.

With reference to FIGS. 6 and 7, the electronic device 114 or the RFID chip 114 is arranged to tag an object 600 such as a vehicle. In this example, the radiator 110 or the entire tag holder 404 may be fixedly attached to the object 600, such as at a windshield 602 of a vehicle 600. By inserting the RFID card 402 having the feeder 112 and the RFID chip 114 into the tag holder 404 through the alignment mechanism as mentioned above (i.e. the pairs of magnets 408 and counter-magnets 410, as well as the mechanical guidelines 412), the feeder 112 and the radiator 110 are substantially aligned. An RFID reader may be used to read the tagging information associated with the tagged object 600 stored in the RFID chip 112 of the complete RFID tag 400.

For example, the RFID tagging device 400 may be used in a system such as a parking system. One or more RFID readers may be installed at the gate of the entrances and/or the exits of a car park. A plurality of tagging devices 400 each includes a tag holder 404 having antenna 108 and an RFID card 402. Each RFID card 402 is embedded with a feeder 112 and a RFID chip 114 storing unique tagging information associated with the vehicle 600 (or the user) registered are issued to users of the car park. The user may fixedly attach the RFID card holder 404 on a windshield 602 of the vehicle 600 using suitable attachment means 604. The tag holder 404/antenna 102 is arranged to co-operate with a RFID tag 402 placed proximately. When the vehicle enters the car park, the user may place his RFID card 402 in the RFID card holder 404 such that the RFID chip 114 may be readable by the RFID reader at the gate. In one example, the RFID chip 114 may store the payment account information of the user which allows the user to pay the parking fees when the vehicle leaves the car park.

In another example, the vehicle may also carry a passenger which is another user of the car park, and the passenger carries another RFID card issued by the car park. When the vehicle approaches the gate or the operating range of the RFID reader and/or the RFID tag, the RFID reader may only access the tagging information stored in the RFID chip 114 in the RFID card 402 properly placed proximate to the RFID card holder 404. The RFID card of the passenger is not readable by the RFID reader as the feeder 112 of the passenger's RFID card is not coupled to the radiator 110.

Alternatively, the passenger may be granted with higher priority in using the car park, and place the passenger's RFID card to the RFID card holder 404 attached to the windshield 602 of the vehicle 600. In this example, the RFID reader at the gate may only access the tagging information stored in the passenger's RFID chip 114 but not the driver's RFID card 402 since the driver's RFID card 402 is not coupled to the radiator 110/antenna 108.

These embodiments are advantages by selectively removing the RFID chip from the tag holder, the tagging device is selectively disabled. This effectively avoids any false-positive and/or true negative of the RFID reading scenarios.

The detachable mechanism also allows different RFID tags to couple with a same tag antenna. As discussed above, passengers of a vehicle may also be authenticated to enjoy the special privileges granted when the vehicle with the passenger's RFID tag place in the tag holder attached to the vehicle.

In addition, the tag holder with the antenna is reusable and only the RFID chip and the feeder are replaced or disposed when necessary. The tag holder with the antenna also enhances the reading range and performance of the RFID chip.

Figure 8:
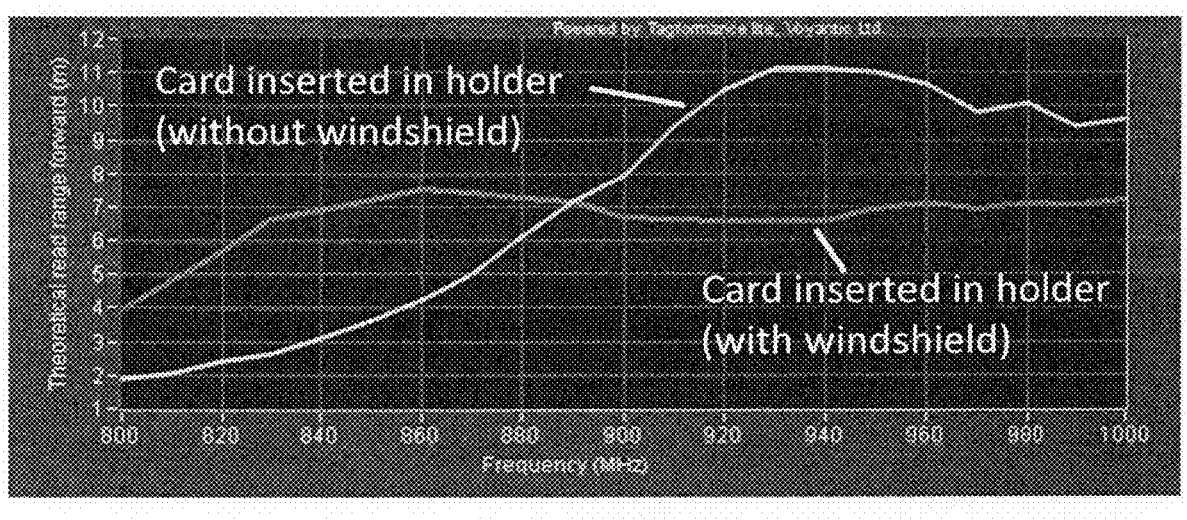
FIG. 8 is a plot showing a measurement of a read range of the RFID tagging device of FIG. 4A.

With reference to FIG. 8, the tagging device 400 may be readable by an RFID reader at a distance of up to 11 m at a frequency of about 930 MHz to 950 MHz. Additionally, the tagging device 400 may be readable by the RFID reader at a distance of around 7 m at a wide range of frequency of about 830 MHz to 1000 MHz with a windshield of a vehicle in between.

Figure 9:
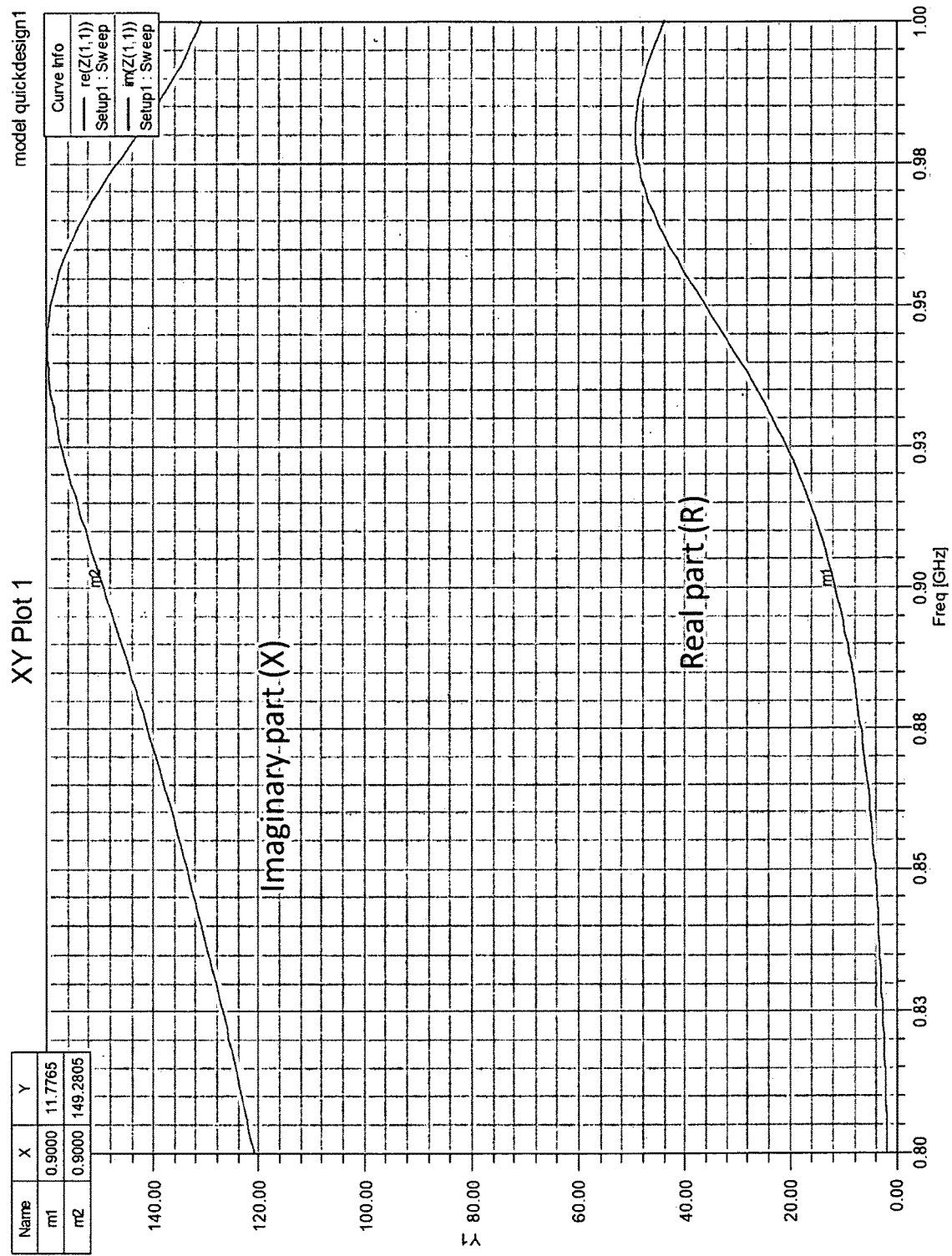
FIG. 9 is a plot showing a simulated result of an input impedance of the accessory of FIG. 2A receiving and removably securing the tag device.
Figure 10:
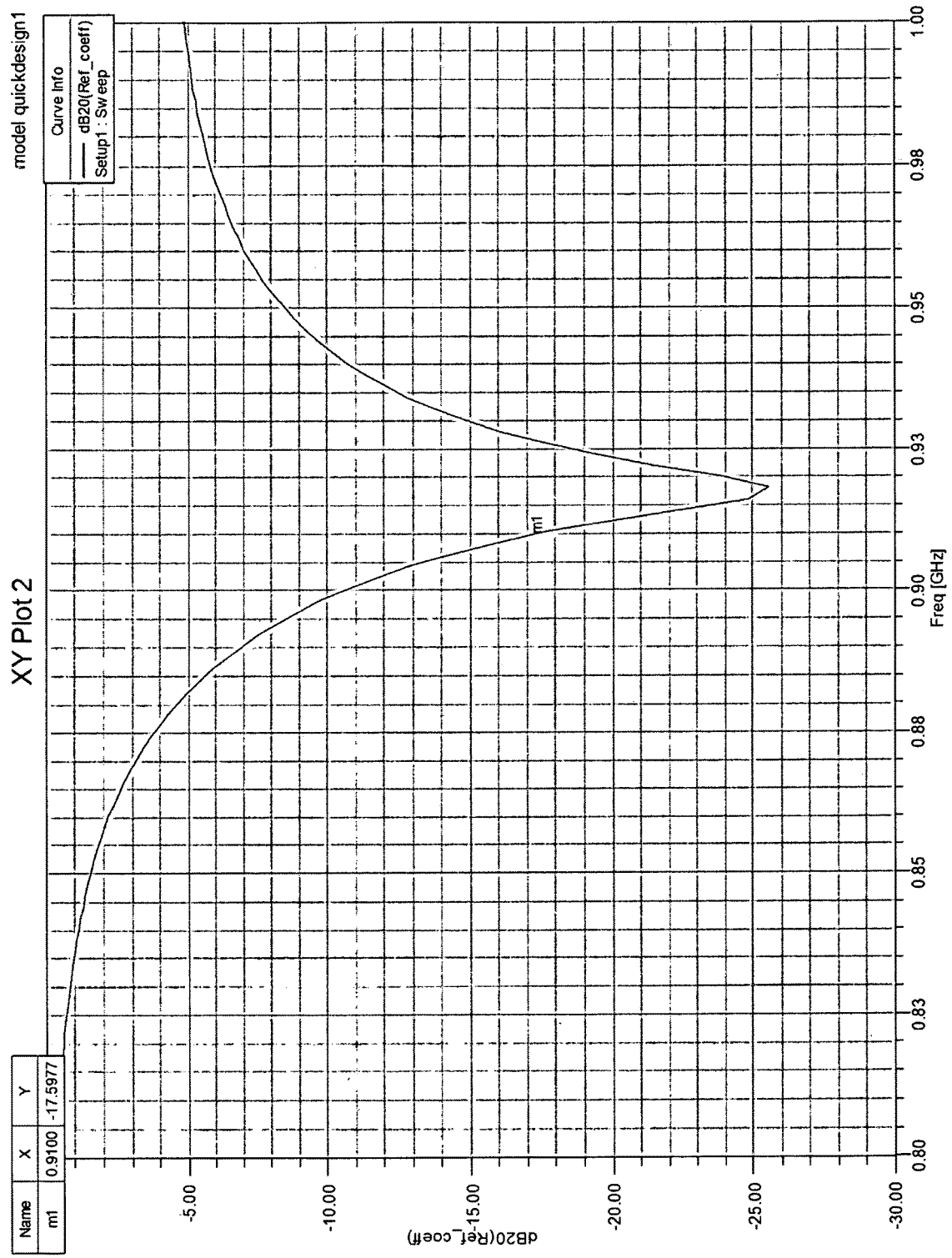
FIG. 10 is a plot showing a simulated result of a reflection coefficient of the accessory of FIG. 2A receiving and removably securing the tag device.
Figure 11:
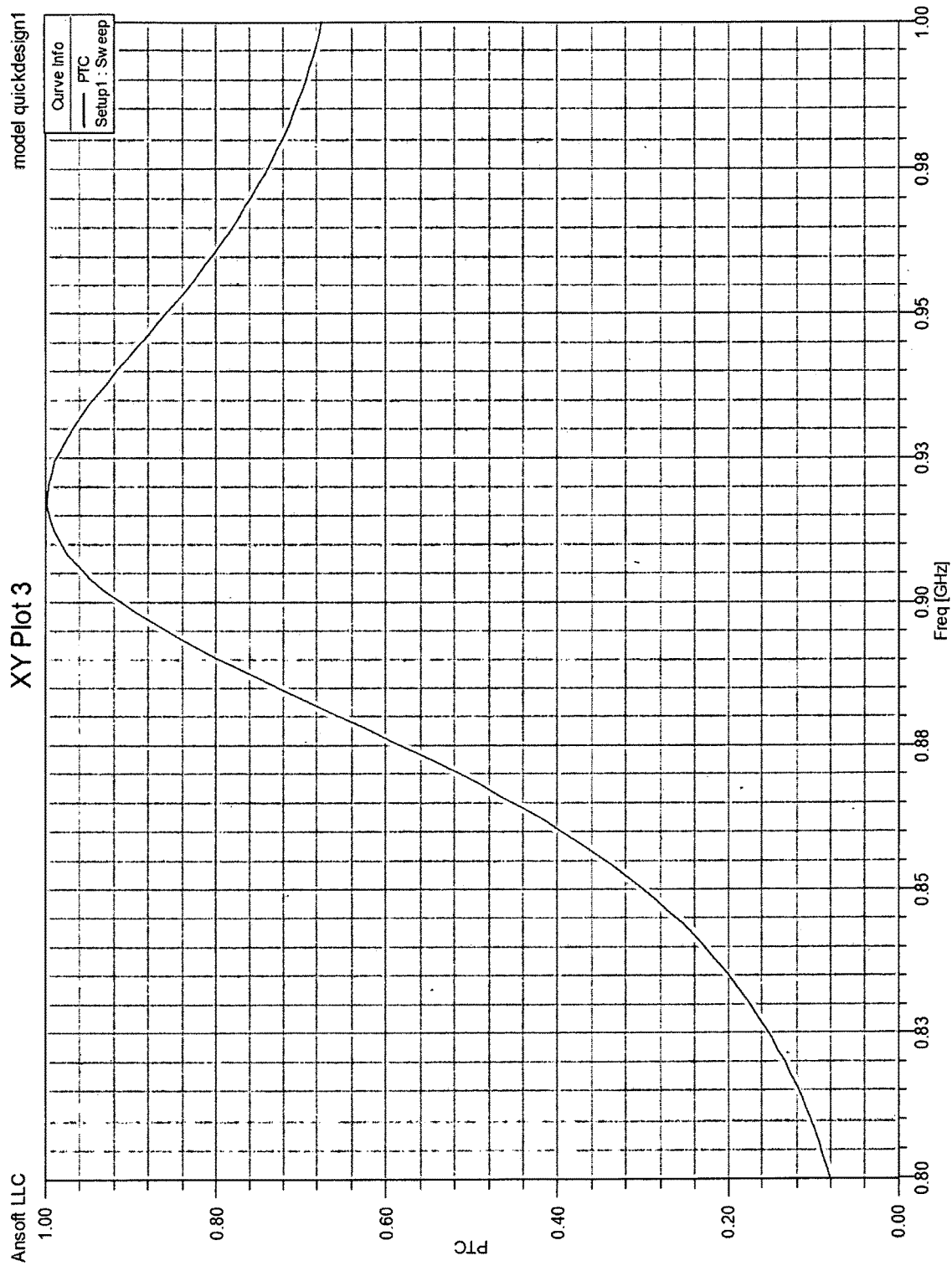
FIG. 11 is a plot showing a simulated result of a power transfer coefficient of the accessory of FIG. 2A receiving and removably securing the tag device.

It is also proved that the tagging device 400 has remarkable performances with reference to FIGS. 9 to 11, which illustrate the input impedance of the tagging device, the reflection coefficient and the power transfer coefficient (PTC) respectively.

Figure 12:
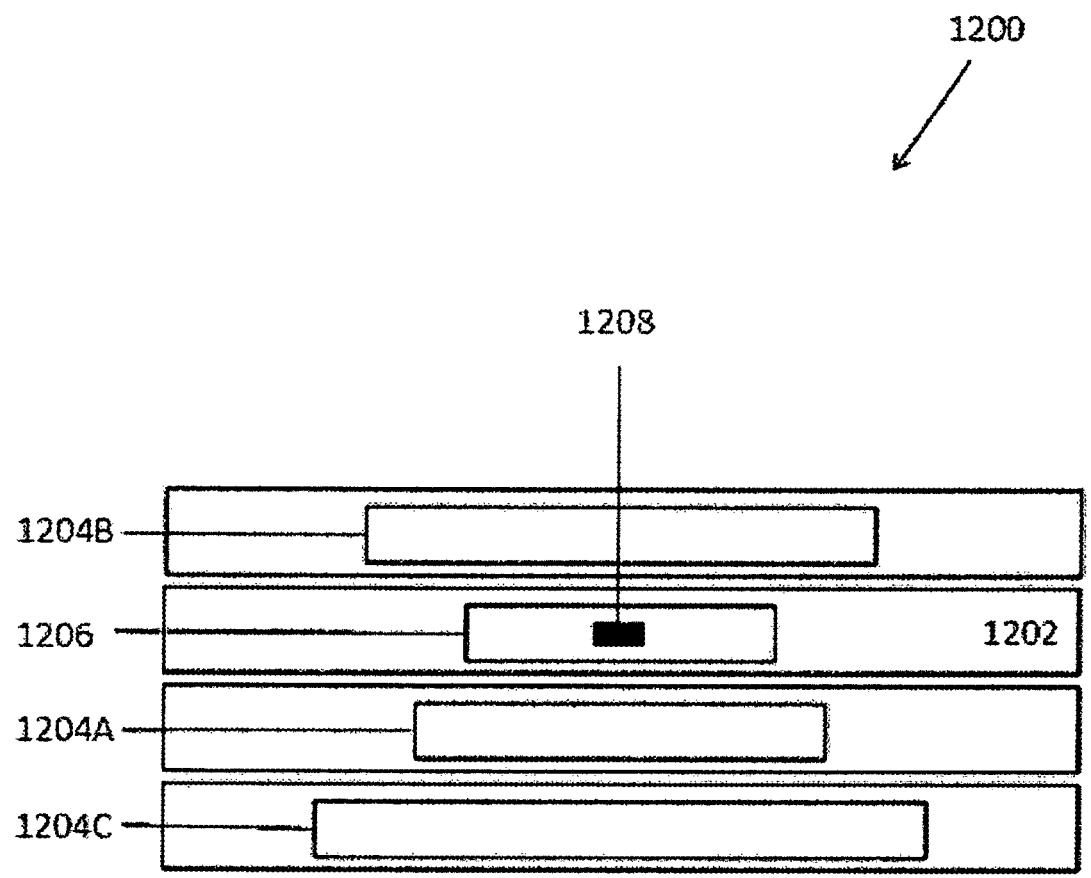
FIG. 12 is a schematic diagram showing a tagging device in accordance with one embodiment of the present invention.

With reference to FIG. 12, there is provide an alternative embodiment of a tagging device 1200 comprising a feeder 1206 electrically connected to an electronic device 1208, wherein the feeder 1206 is further arranged to selectively couple to at least one radiator 1204 such that the electronic device 1208 is further arranged to operate with an electromagnetic radiation received by the at least one radiator 1204.

In this embodiment, a plurality of radiators (1204A, 1204B and 1204C) may be coupled to a tag 1202 comprising the feeder 1206 (or a near-range radiator) and the tag chip 1208 similar to the previous embodiments. This may facilitate the tagging device 1200 to operate with different operation/reading range. For example, the tag 1202 comprising the feeder 1206 and the tag chip 1208 may operate in a near range (such as within several centimetres), the tag 1202 may be coupled to a short range radiator 1204A such that the tag 1202 may operate in a short range (such as from several centimetres to several meters), the tag 1202 may be coupled to a medium range radiator 1204B such that the tag 1202 may operate in a medium range (such as from several meters to 10 meters), or the tag 1202 may be coupled to a long range radiator 1204C such that the tag 1202 may operate in a long range (such as further than 10 meters). Alternatively or optionally, the tag 1202 may couple to two or more of these different range radiators such that the tag device 1202 may operate in two or more of the abovementioned reading range.

Similarly, one or all of the radiators 1204A, 1204B and 1204C are arranged to be not (fully) functional when the radiator is uncoupled to the feeder 1206. In other words, one or more of these radiators are only functional when it is properly coupled and aligned with the feeder 1206 so as to become functional and hence the radiator may then be operable to receive an electromagnetic signal from a reader such as an RFID reader.

The embodiments of the present invention cover not only the in vehicle application, but any possible 2-piece tag holder applications. Advantageously, this embodiment will enable user to carry a single tag (RFID card) for use in different scenarios. For example, the user such as a member of a club may tap his member card embedded with an RFID tag on a RFID reader at an entrance to certain premises. He may combine the tag to a tag holder comprising a medium range radiator such that the tag may be read by an overhead RFID reader mounted at an entrance to an exhibition to record his attendance to a system associated with the overhead RFID reader, which saves the member from manually tapping his member card to gain an access at the entrance. He may also place his tag to a tag holder comprising a long range radiator fixed to a windshield of his car such that the tag may be read by a long range RFID reader installed at an entrance of a car park and he may enter or leave a car park without have to manually tap his tag to a near range reader.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An accessory for a tag device, comprising
a tag holder defining with a slot arranged to receive the tag device and to removably secure the tag device in a predetermined position, the slot comprising an alignment mechanism arranged to align the tag device in the predetermined position within the slot; and
an antenna provided on the tag holder, wherein the antenna has a radiator arranged to couple to a feeder of the tag device when the tag device is positioned in the predetermined position within the slot and when the radiator and the feeder are aligned,
wherein the alignment mechanism includes a magnet arranged to cooperate with a counter-piece provided at a corresponding position on the tag device.

2. The accessory in accordance with claim 1, wherein the counter-piece comprises a counter-magnet arranged to magnetically couple with the magnet when the tag device is placed in the predetermined position within the slot.

3. The accessory in accordance with claim 1, wherein the tag device is in form of a card.

4. The accessory in accordance with claim 3, wherein the counter-piece is provided on a front surface of the card.

5. The accessory in accordance with claim 4, wherein the counter-piece is further arranged to resist the tag device from being secured by the tag holder when the tag device is in the slot with a back surface of the card placed proximally to the magnet.

6. The accessory in accordance with claim 5, wherein the tag device is repelled by a mutual repulsive force generated by magnets with the same polarity on both the tag device and the slot.

7. The accessory in accordance with claim 1, wherein the alignment mechanism further comprises a mechanical guiding structure arranged to match with the tag device.

8. The accessory in accordance with claim 7, wherein the mechanical guiding structure includes at least one groove arranged to match with a respective edge of the tag device.

9. The accessory in accordance with claim 1, wherein the radiator is a dipole antenna.

10. The accessory in accordance with claim 1, wherein the feeder is a small-loop antenna.

11. The accessory in accordance with claim 1, wherein the tag holder or the tag device or both the tag holder and the tag device comprise a dielectric material.

12. The accessory in accordance with claim 1, wherein a multi-layer tag antenna is formed by a combination of the radiator and the feeder when the two are aligned.

13. The accessory in accordance with claim 1, wherein the tag device comprises an electronic device arranged to tag an object.

14. The accessory in accordance with claim 13, wherein the electronic device is arranged to operate with an electromagnetic radiation received by the radiator.

15. The accessory in accordance with claim 14, wherein the electromagnetic radiation is a radio frequency signal.

16. The accessory in accordance with claim 15, wherein the tag device is a radio frequency identification (RFID) card.

17. The accessory in accordance with claim 1, wherein the tag holder is fixedly attached to an object.

18. The accessory in accordance with claim 17, wherein the object is a vehicle.

19. The accessory in accordance with claim 18, wherein the tag holder is fixedly attached to a windshield of the vehicle.

20. A radio frequency identification (RFID) tagging device comprising a tag device in a form of an RFID card, and an accessory in accordance with claim 1, wherein the tag holder is arranged to receive the RFID card and to removably secure the RFID card in the predetermined position within the slot defined by the tag holder.

* * * * *